US006087818A

United States Patent [19]

Hughes

[11] Patent Number: 6,087,818
[45] Date of Patent: Jul. 11, 2000

[54] RECREATIONAL VEHICLE VOLTAGE BOOSTER

[76] Inventor: Robert C. Hughes, 35587 Larkspur Dr., Wildomar, Calif. 92595

[21] Appl. No.: 09/250,219

[22] Filed: Feb. 13, 1999

[51] Int. Cl.[7] ................................ G05F 5/00; H02M 1/10

[52] U.S. Cl. .......................... 323/301; 323/356; 363/142; 363/146

[58] Field of Search .................................... 323/268, 271, 323/272, 301, 340, 356; 363/142, 143, 146; 307/71; 361/18

[56] References Cited

U.S. PATENT DOCUMENTS

| | | | |
|---|---|---|---|
| 4,937,731 | 6/1990 | Konopka | 363/143 |
| 5,859,756 | 1/1999 | Pressman et al. | 361/18 X |
| 5,973,948 | 10/1999 | Hahn et al. | 363/146 |

*Primary Examiner*—Jessica Han
*Attorney, Agent, or Firm*—Loyal McKinley Hanson

[57] ABSTRACT

A voltage booster device for increasing the voltage level of power received by a recreational vehicle (RV) from a separate 120-volt power source includes an electrical box, a power cord and female outlet on the box, and an encapsulated transformer within the box. The transformer (e.g., an autotransformer) is adapted to increase the actual voltage level of the separate 120-volt power source a predetermined amount. A relay is provided for switching the transformer, the power cord, and the female outlet between (i) a first circuit configuration that couples power from the power cord to the female outlet via the transformer so that the transformer increases the voltage level by the predetermined amount, and (ii) a second circuit configuration that bypasses the transformer so that the transformer does not increase the voltage level by the predetermined amount. A control circuit controls the relay so that (i) the relay switches to the first circuit configuration when the actual voltage of the separate 120-volt power source falls below a predetermined first threshold level, and (ii) the relay switches to the second circuit configuration when the actual voltage rises above a predetermined second threshold level. One embodiment includes a mounting plate with a rounded end that functions as a handle, and a case-hardened steel loop that receives a security chain.

10 Claims, 2 Drawing Sheets

Fig. 1
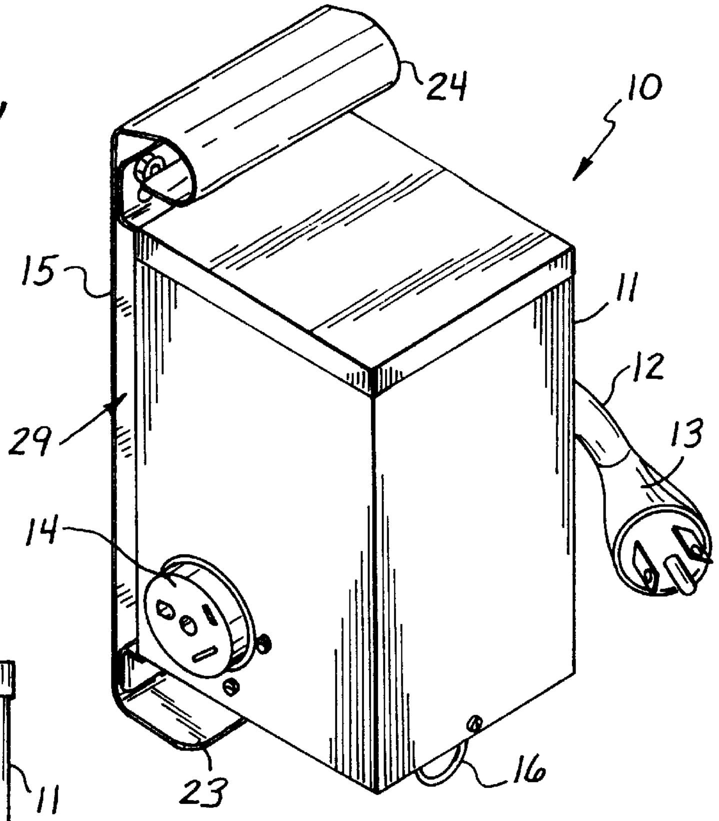
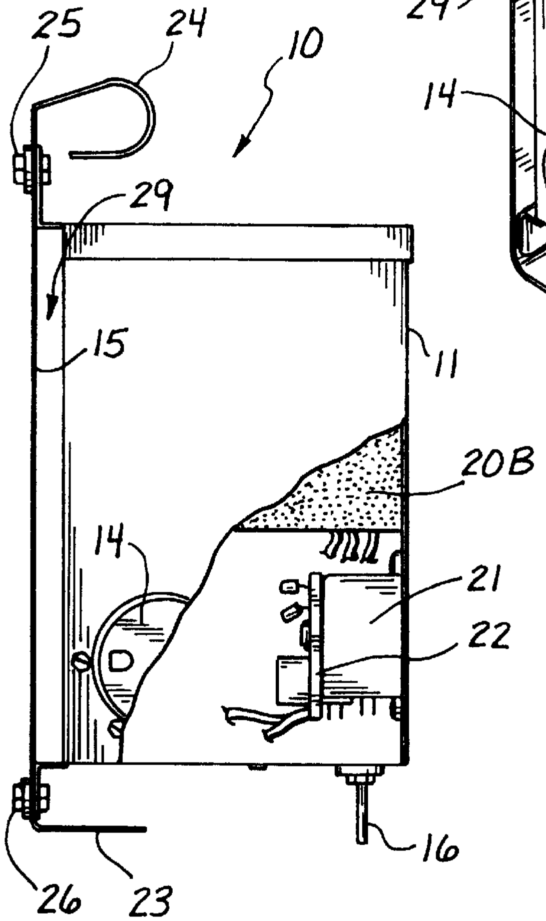
Fig. 2
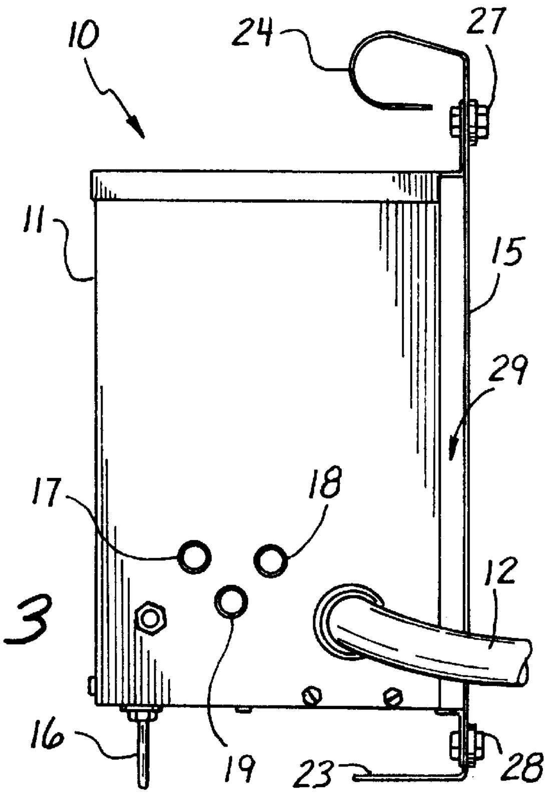
Fig. 3

RECREATIONAL VEHICLE VOLTAGE BOOSTER

BACKGROUND OF THE INVENTION

1. Technical Field

This invention relates generally to electrical accessories for recreational vehicles (RVs), and more particularly to a device for boosting the actual voltage of 120-volt alternating current (AC) power at an RV park power pedestal during brownout periods or other conditions of low voltage.

2. Description of Related Art

Low park input voltage is a problem to RV owners. The performance of the RV's air conditioning, refrigerator, microwave, coffee pot, lighting, and other electrical devices suffers. Some appliances may not function at all and low voltage may even damage them. So, RV owners need some way to alleviate low voltage concerns.

Recall in that regard that a typical RV includes 120-volt wiring with an external 120-volt power connection. In order to couple power to the RV, the owner connects the 120-volt power connection to a separate 120-volt AC power source (e.g., 120-volt service connection at an RV park). In doing so, the RV owner must accept whatever voltage is actually available. At an RV park, low voltage conditions often prevail.

Some RV owners use a voltage booster device between the RV 120-volt power connection and the separate 120-volt power source for the purpose of increasing the actual voltage supplied by the separate 120-volt power source. But existing voltage boosters have some drawbacks. One existing voltage booster, for example, includes an autotransformer that the owner can switch into the circuit when the actual voltage of the external power source drops to an unacceptable level. The owner simply flips a switch to do so. A second switch on the unit (a high-low switch) enables the owner to flip between "high" and "low" boost positions. The owner uses the low boost position most of the time, but flips the high-low switch to the high boost position if the actual voltage of the separate 120-volt power source drops below 110 volts.

One major problem is that the owner must continually monitor the line voltage and often too frequently leave the comfort of the RV to attend to the voltage booster. The owner must turn the booster on when it is needed. He must turn it off when it is not needed. He must flip between the high and low boost positions when required. So RV owners need a way to alleviate this concern.

SUMMARY OF THE INVENTION

This invention addresses the problem outlined above by providing an RV voltage booster that turns on and off automatically. Once the RV owner has connected the voltage booster between the RV power connection and the separate 120-volt power source, a control circuit component of the voltage booster automatically turns the unit on when the line voltage falls below a predetermined first threshold value and turns it back off when the line voltage rises above a predetermined second threshold value. Thus, the RV owner is relieved of continually monitoring the line voltage and leaving the RV to manually turn the voltage booster on and off.

The illustrated embodiment does that and much more. It includes an epoxy-encapsulated transformer within a sturdy steel housing in the form of a conventional National Electrical Manufacturer's Association (NEMA) type 3, weatherproof electrical box. A NEMA3 travel trailer female plug is provided on the box for connecting the RV external power connection to the unit, and a NEMA3 travel trailer molded cord and male plug are provided on the box for connecting the unit to the separate 120-volt power source.

An adaptive mounting plate attached to the box includes a rounded portion that serves as a handle for use in manually transporting the unit. A case-hardened U-bolt on the housing serves as a security chain loop that enables the owner to lock the unit to a power pedestal or other structure with a security chain. Diagnostic indicator lights provide information about the to separate 120-volt power source, and an optional primary switch enables the power to select between high and low voltage transformer modes.

To paraphrase some of the more precise language appearing in the claims, a voltage booster device for increasing the voltage level of power received by a recreational vehicle from a separate 120-volt power source includes an electrical box with a power cord and a female electrical outlet. The power cord includes a male plug adapted to plug into a female outlet of the separate 120-volt power source, and the female electrical outlet is adapted to receive the male plug of a 120-volt power cord on the recreational vehicle.

A transformer encapsulated within a body of material disposed within the electrical box functions to increase the actual voltage level of the separate 120-volt power source a predetermined amount (e.g., 12%). A relay switches the transformer, the power cord, and the female outlet between (i) a first circuit configuration that couples power from the power cord to the female outlet via the transformer so that the transformer increases the voltage level by the predetermined amount, and (ii) a second circuit configuration that bypasses the transformer so that the transformer does not increase the voltage level by the predetermined amount. A control circuit is provided for controlling the relay so that (i) the relay switches to the first circuit configuration when the actual voltage of the separate 120-volt power source falls below a predetermined first threshold level, and (ii) the relay switches to the second circuit configuration when the actual voltage rises above a predetermined second threshold level.

Thus, the RV voltage booster of this invention provides an electrically and mechanically user-friendly unit that relieves the owner of continually monitoring the line voltage and leaving the RV to manually turn the voltage booster on and off. The following illustrative drawings and detailed description make the foregoing and other objects, features, and advantages of the invention more apparent.

BRIEF DESCRIPTION OF THE DRAWINGS

FIG. 1 of the drawings is a perspective top, front, and left side view of an RV voltage booster device constructed according to the invention;

FIG. 2 is a left side view with a portion of the housing broken out to reveal internal components;

FIG. 3 is a right side view showing the indicator lights; and

DESCRIPTION OF THE PREFERRED EMBODIMENTS

Figure 4:
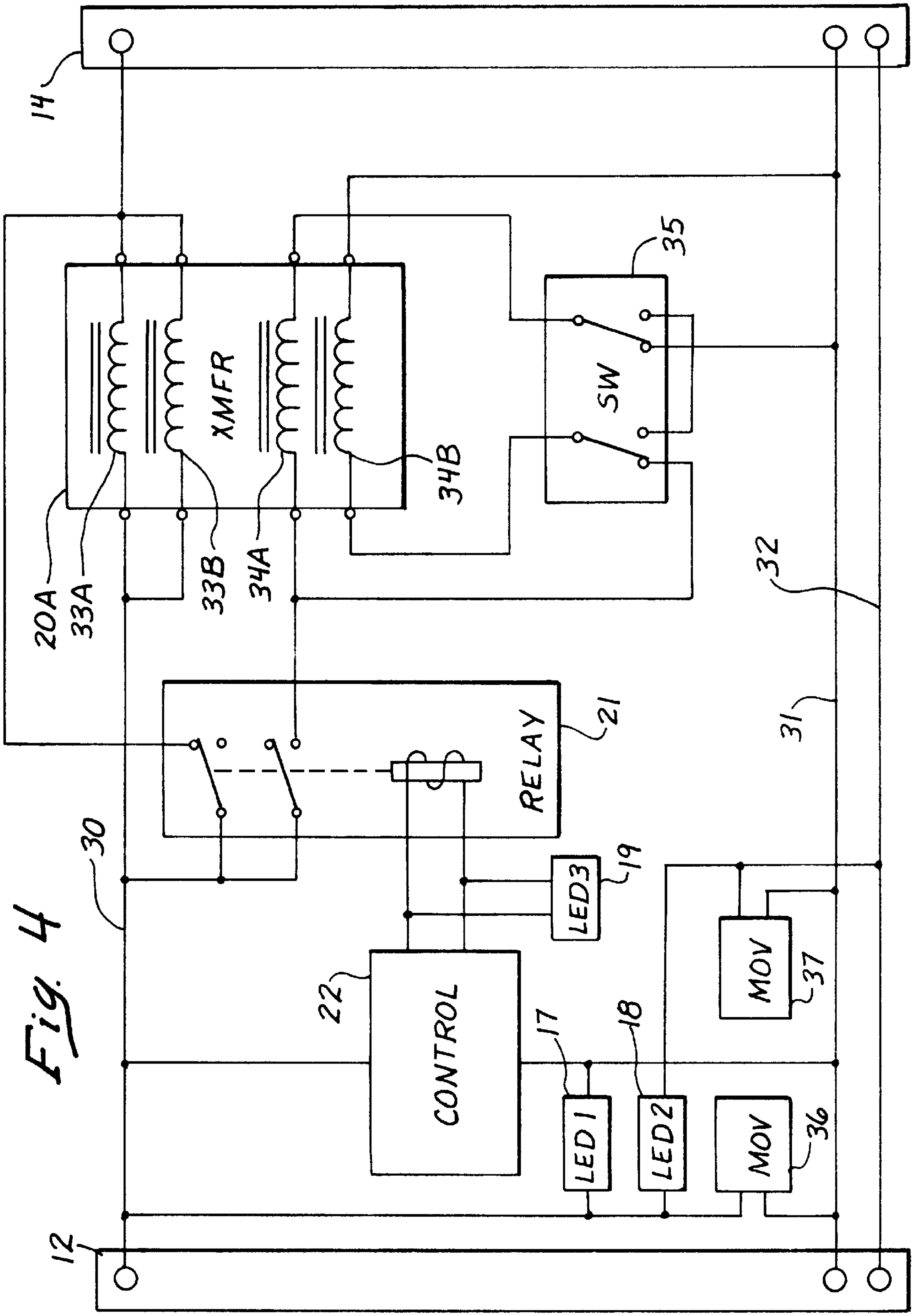
FIG. 4 is a block circuit diagram of the circuitry employed.

FIGS. 1–4 show various details of a RV voltage booster device 10 constructed according to the invention. It is designed for operation between the male plug of a 120-volt power cord of an RV (not shown) and a female outlet of a separate 120-volt power source (not shown). Generally, the voltage booster device 10 includes a housing in the form of an electrical box 11 (FIGS. 1–3) that is outfitted with an RV-rated power cord 12 marked “Recreational Vehicle” terminating in a male plug 13 that is adapted to plug into the female outlet of the separate 120-volt power source. In other words, the male plug 13 mates with the female outlet on the separate 120-volt power source. The electrical box 11 is also outfitted with an RV-rated female electrical outlet 14 that is adapted to receive (i.e., mate with) the male plug of the 120-volt power cord on the RV.

A mounting plate 15, a security chain loop 16, and three indicator lights 17, 18, and 19 (visible in FIG. 3) are included on the exterior of the electrical box 11, and a transformer 20A (visible only in FIG. 4) is encapsulated within a body of epoxy material 20B (FIG. 2) disposed within the electrical box 11. The transformer 20A is connected by suitable wiring to the power cord 12, the female outlet 14, and the indicator lights 17, 18, and 19. It is also connected to a relay 21 that is controlled by a control circuit 22 in the manner subsequently described with reference to FIG. 4.

As an idea of size, the illustrated electrical box 11 takes the form of a commercially available EIMA3 rated electrical box measuring about 5 inches wide, 6 inches deep, and 9 inches high. This is a sturdy, steel, weatherproof housing for the components within. The mounting plate 15 is fabricated from a sheet of metal measuring about 18 inches long by 5 inches wide by bending one 2-inch end portion with a right-angle bend form a 2-inch long foot 23, and by bending a 2.5-inch opposite end portion on a 1.5-inch radius to form a handle 24. The mounting plate 15 is then secured to the electrical box 11 by bolting it onto two standoff flanges on the electrical box 11 using four nut-and-bolt combinations 25–28. The nut-and-bolt combinations 25 and 26 are visible in FIG. 2 and the nut-and-bolt combinations 27 and 28 are visible in FIG. 3. This leaves a 0.5-inch space 29 between the electrical box 11 and the mounting plate 15 for air flow and related heat dissipation. The standoff flanges are provided on a conventional electrical box for use in a conventional installation in order to mount the electrical box 11 on a vertical support structure while keeping the rest of the electrical box 11 spaced apart from the structure for heat dissipation purposes. The mounting plate is ornamental. It also is functional in converting a readily available electrical box having two such standoff mounting flanges to a portable electrical box adapted to rest upon the ground or other horizontal surface.

The power cord 12 is a 4-foot long NEMA3 rated travel trailer molded cord and male plug. The female outlet 14 is also a NEMA3 rated component.

The security chain loop 16 is a case-hardened steel, 1.75-inch diameter, U-bolt type of component that is bolted onto the electrical box 11. In addition to accepting a security chain, the security chain loop 16 cooperates with the foot 23 of the mounting plate 15 as a leg upon which the device 10 stands. The transformer is a commercially available autotransformer that the manufacturer winds to specification for 120-volt, 30-ampere or 50-ampere service and encapsulates in the electrical box 11. The resulting device 10 weighs about 30 to 40 pounds so that the RV owner can readily transport it manually by grasping the handle 24.

Now consider FIG. 4 for further circuit details. The lines 30, 31, and 32 represent wiring within the electrical box 11. The line 30 (conventionally black in color) is the single phase 120-volt line, the line 31 is the neutral line (white), and the line 32 (green) is the ground line. Lines 31 and 32 connect neutral and ground wires of the power cord 12 (white and green) directly to the female outlet 14, while line 30 connects 120-volt wire of the power cord 12 (black) to the female outlet 14 in two different circuit configurations controlled by switching the relay 21.

The relay 21 includes a double-pole-double-throw (DPDT) switch portion that is connected to the power cord 12, the female outlet 14, and the transformer 20A. Those connections are as indicated in FIG. 4 so that the relay 21 functions as means for switching the transformer 20A, the power cord 12, and the female outlet 14 between (i) a first circuit configuration that couples power from the power cord 12 to the female outlet 14 via the transformer 20A so that the transformer 20A increases the voltage level by the predetermined amount (e.g., 12%), and (ii) a second circuit configuration that bypasses the transformer 20A so that the transformer 20A does not increase the voltage level by the predetermined amount. The control circuit 22 controls the relay 21. It functions as means for controlling the relay 21 so that (i) the relay 21 switches to the first circuit configuration when the actual voltage of the separate 120-volt power source falls below a predetermined first threshold level (e.g., 116 volts), and (ii) the relay 21 switches to the second circuit configuration when the actual voltage rises above a predetermined second threshold level (e.g., 118 volts).

One of ordinary skill in the art can readily implement a voltage booster device within the scope of the claims based upon the foregoing and subsequent descriptions. The illustrated transformer 20A is an encapsulated dry-type autotransformer available from Federal Pacific Transformer Company that includes first and second secondary windings 33A and 33B. They are wired in parallel while first and second primary winding 34A and 34B that are connected in parallel as illustrated by an optional DPDT switch 35 for a 12% increase in voltage over the actual voltage of the separate 120-volt power source (i.e., the input voltage). Flipping the switch 35 connects the first and second primary windings 34A and 34B in series for a 6% increase in voltage over the input voltage. The switch 35 may be located on the electrical box 11 for operation from the exterior of the electrical box 11, or it may be located within the electrical box 11 along with the control circuit 22.

The control circuit 22 includes readily available components, including operational amplifiers and zener diodes that are arranged according to known circuit design techniques to control the relay 21 in the manner specified above.

A suitable control circuit is commercially available from Hughes Autoformer of Lake Elsinore, Calif. It includes a three-second delay in switching to avoid relay chatter from transient and unstable line conditions. The indicator lights 17 and 18 indicate open ground, open neutral, or reverse polarity. The indicator light 19 indicates when the device 10 is in the boost mode (i.e., the first circuit configuration). Metal oxide varistors 36 and 37 are preferably included for surge protection.

Thus, the invention provides RV voltage booster that turns on and off automatically. The RV owner is relieved of continually monitoring the line voltage and leaving the RV to manually turn the voltage booster on and off. This is accomplished in a sturdy unit meeting NEMA standards that includes a handy handle, a security chain loop, and diagnostic indicator lights. Although an exemplary embodiment has been shown and described, one of ordinary skill in the art may make many changes, modifications, and substitutions without necessarily departing from the spirit and scope of the invention.

What is claimed is:

1. A device for increasing the voltage level of power received by a recreational vehicle from a separate 120-volt power source, comprising:

an electrical box;

a power cord on the electrical box that includes a male plug adapted to plug into a female outlet of the separate 120-volt power source;

a female electrical outlet on the housing that is adapted to receive a male plug of a 120-volt power cord on the recreational vehicle;

a transformer encapsulated within a body of material disposed within the electrical box, the transformer being adapted to increase the actual voltage level of the separate 120-volt power source a predetermined amount;

relay means for switching between (i) a first circuit configuration that couples power from the power cord to the female outlet on the housing via the transformer so that the transformer increases the voltage level by the predetermined amount, and (ii) a second circuit configuration that bypasses the transformer so that the transformer does not increase the voltage level by the predetermined amount; and control means for controlling the relay means so that (i) the relay means switches to the first circuit configuration when the actual voltage of the separate 120-volt power source falls below a predetermined first threshold level, and (ii) the relay means switches to the second circuit configuration when the actual voltage rises above a predetermined second threshold level.

2. A device as recited in claim 1, wherein the control means is adapted to controlling the relay means so that (i) the relay means switches to the first circuit configuration when the actual voltage of the separate 120-volt power source falls below 116 volts, and (ii) the relay means switches to the second circuit configuration when the actual voltage rises above a 118 volts.

3. A device as recited in claim 1, wherein the transformer is adapted to increase the actual voltage level of the separate 120-volt power source by about 12 percent.

4. A device as recited in claim 1, further comprising a first indicator light on the electrical box adapted to indicate when the relay means is switched to the first circuit configuration.

5. A device as recited in claim 4, further comprising second and third indicator lights on the electrical box adapted to indicate correct line connections between the device and the separate 120-volt power source.

6. A device as recited in claim 1, further comprising a mounting plate in the form of a sheet of metal connected to the electrical box, the sheet of metal having a rounded upper edge portion adapted to function as a handle.

7. A device as recited in claim 5, further comprising means on the electrical box for receiving a security chain.

8. A device as recited in claim 1, wherein the transformer includes first and second primary windings and the device includes switch means connected to the first and second primary windings for switching between a low voltage increase position in which the switch connects the first and second primary windings in series and a high voltage increase position in which the switch connects the first and second primary windings in parallel.

9. A device for increasing the voltage level of power received by a recreational vehicle from a separate 120-volt power source, comprising:

an electrical box, a power cord on the electrical box that includes a male plug adapted to plug into a female outlet of the separate 120-volt power source, and a female electrical outlet on the housing that is adapted to receive a male plug of a 120-volt power cord on the recreational vehicle;

a transformer encapsulated within a body of material disposed within the electrical box, the transformer having first and second primary windings and the transformer being adapted to increase the actual voltage level of the separate 120-volt power source by a first predetermined amount when the first and second primary windings are connected in parallel and by a second predetermined amount when the first and second primary windings are connected in series; and switch means connected to the first and second primary windings for switching between a low voltage increase position in which the switch connects the first and second primary windings in series and a high voltage increase position in which the switch connects the first and second primary windings in parallel.

10. A method for increasing the voltage level of power received by a recreational vehicle from a separate 120-volt power source, comprising:

an electrical box outfitted with (i) a power cord, (ii) a female electrical outlet, (iii) a transformer encapsulated within a body of material disposed within the electrical box, which transformer is adapted to increase the actual voltage level of the separate 120-volt power source a predetermined amount, (iv) relay means for switching between a first circuit configuration that couples power from the power cord to the female outlet via the transformer so that the transformer increases the voltage level by the predetermined amount, and a second circuit configuration that bypasses the transformer so that the transformer does not increase the voltage level by the predetermined amount, and (v) control means for controlling the relay means so that the relay means switches to the first circuit configuration when the actual voltage of the separate 120-volt power source falls below a predetermined first threshold level, and the relay means switches to the second circuit configuration when the actual voltage rises above a predetermined second threshold level;

connecting the male plug of the power cord to the female outlet of the separate 120-volt power source;

connecting the male plug of the 120-volt power cord on the recreational vehicle to the female outlet on the electrical box; and using the control means to switch the relay means between the first circuit configuration and the second circuit configuration according to the actual voltage of the separate 120-volt power source.

* * * * *